United States Patent
Hadjigeorge et al.

(10) Patent No.: US 8,076,525 B2
(45) Date of Patent: Dec. 13, 2011

(54) GASOLINE CRACKING

(75) Inventors: George A. Hadjigeorge, Sugar Land, TX (US); Colin John Schaverien, Amsterdam (NL); Nicolaas Wilhelmus Joseph Waij, Amsterdam (NL)

(73) Assignee: Shell Oil Company, Houston, TX (US)

( * ) Notice: Subject to any disclaimer, the term of this patent is extended or adjusted under 35 U.S.C. 154(b) by 724 days.

(21) Appl. No.: 11/793,318

(22) PCT Filed: Dec. 19, 2005

(86) PCT No.: PCT/EP2005/056896
§ 371 (c)(1),
(2), (4) Date: Feb. 14, 2008

(87) PCT Pub. No.: WO2006/067104
PCT Pub. Date: Jun. 29, 2006

(65) Prior Publication Data
US 2008/0188702 A1    Aug. 7, 2008

Related U.S. Application Data

(60) Provisional application No. 60/637,573, filed on Dec. 20, 2004.

(51) Int. Cl.
*C07C 4/02* (2006.01)

(52) U.S. Cl. ............... 585/653; 502/68; 208/72; 208/73; 208/74; 208/77; 208/113; 208/120.01; 208/152; 208/158

(58) Field of Classification Search ............... 585/653; 208/72, 73, 74, 77, 113, 120.01, 152, 158; 502/68
See application file for complete search history.

(56) References Cited

U.S. PATENT DOCUMENTS

| | | | | |
|---|---|---|---|---|
| 3,748,251 A * | 7/1973 | Demmel et al. | ............... | 208/74 |
| 3,761,391 A * | 9/1973 | Conner | ............... | 208/74 |
| 3,928,172 A * | 12/1975 | Davis et al. | ............... | 208/77 |
| 4,871,446 A | 10/1989 | Herbst et al. | ............... | 208/152 |
| 4,943,672 A | 7/1990 | Hamner et al. | ............... | 585/737 |
| 5,059,299 A | 10/1991 | Cody et al. | ............... | 208/27 |
| 5,154,818 A | 10/1992 | Harandi et al. | ............... | 208/74 |
| 5,785,862 A | 7/1998 | Graham et al. | ............... | 210/723 |
| 6,106,697 A | 8/2000 | Swan et al. | ............... | 208/77 |
| 6,776,898 B1 | 8/2004 | Wittenbrink et al. | ............... | 208/89 |
| 2002/0003103 A1 | 1/2002 | Henry et al. | ............... | 208/106 |
| 2002/0189973 A1 | 12/2002 | Henry et al. | ............... | 208/74 |
| 2003/0135077 A1 * | 7/2003 | O'Rear et al. | ............... | 585/613 |
| 2003/0203982 A1 | 10/2003 | Davis et al. | ............... | 518/719 |

FOREIGN PATENT DOCUMENTS

| | | |
|---|---|---|
| EP | 668342 | 8/1995 |
| EP | 776959 | 6/1997 |
| WO | WO99/20720 | 4/1999 |
| WO | WO99/34917 | 7/1999 |

* cited by examiner

*Primary Examiner* — Prem C Singh
(74) *Attorney, Agent, or Firm* — Charles W. Stewart

(57) ABSTRACT

Process for the preparation of $C_3$ and $C_4$ olefins and gasoline by: (a) contacting in a fluidised bed reactor a light hydrocarbon feedstock with a first catalyst inventory comprising a medium pore size zeolite catalyst, wherein the first catalyst inventory is a fresh catalyst inventory; (b) combining at least part of the catalyst inventory as used in step (a) with one or more catalyst streams to form a second catalyst inventory comprising a medium pore size zeolite catalyst and a large pore size zeolite catalyst; (c) contacting a hydrocarbon feedstock with the second catalyst inventory in a reactor riser to form cracked products.

25 Claims, 2 Drawing Sheets

GASOLINE CRACKING

The present application claims priority from U.S. Patent Application No. 60/637,573 filed 20 Dec. 2004.

FIELD OF THE INVENTION

The invention relates to the conversion of a hydrocarbon feedstock to $C_3$ and/or $C_4$ olefins.

BACKGROUND OF THE INVENTION

Global demand for $C_3$-$C_4$ olefins herein also referred to as lower olefins is estimated to grow at 5-7% per year. Various processes have been studied to increase the yield to these lower olefins in fluid catalytic cracking (FCC) processes.

In FCC processes a preheated hydrocarbonaceous feedstock of a high boiling point range is brought into contact with a hot cracking catalyst in a riser. The feed is cracked into lower boiling products, such as dry gas, LPG, gasoline, and cycle oils. Furthermore, coke and non-volatile products deposit on the catalyst resulting in a spent catalyst. The riser exits into a separator wherein the spent catalyst is separated from the reaction products. In the next step the spent catalyst is stripped with steam to remove the non-volatile hydrocarbon products from the catalyst. The stripped catalyst is passed to a regenerator in which coke and remaining hydrocarbonaceous materials are combusted and wherein the catalyst is heated to a temperature required for the cracking reactions. Hereafter the hot regenerated catalyst is returned to the riser reactor zone. In operation, fresh catalyst must be added to the unit to make up for losses and to maintain the catalyst activity. Feeds that can be used for FCC processes are gas oils and residues and include straight run (atmospheric) gas oil, vacuum gas oil, and coker gas oils. Catalysts that can be used for FCC processes are generally based on zeolites, especially large pore synthetic faujasites, such as zeolites X and Y.

US-A-2002/0189973 describes a FCC process having increased production of light olefins, including propylene. To increase the production of light olefins at least two risers are being used feeding into a single separation-stripping vessel. The FCC feed is catalytically cracked to produce a crackate that comprises naphtha, propylene and other cracked products in a first riser, with recovery and recycle of at least a portion of the naphtha crackate as feed into the second riser, in which it is catalytically cracked into products comprising additional propylene. As cracking catalyst the same catalyst is used in both risers comprising large and medium pore, shape selective zeolite components.

The disadvantage of the process as disclosed in US-A-2002/0189973 is that it is only applicable for FCC units that have at least two riser reactors. Revamping of existing units with only one riser by building an extra riser is expensive. Moreover, it would be desirable to increase the yield to lower olefins further.

Hence, the object of the present invention is to provide a process with increased selectivity to C3 and C4 olefins.

SUMMARY OF THE INVENTION

This object is achieved by the following process. Process for the preparation of $C_3$ and/or $C_4$ olefins by:
(a) contacting in a reactor a light hydrocarbon feedstock with a first catalyst inventory comprising a medium pore size zeolite catalyst and thereby forming a product stream comprising C3 and/or C4 olefins; (b) combining at least part of the catalyst inventory as used in step (a) with one or more catalyst streams to form a second catalyst inventory comprising at least a medium pore size zeolite catalyst and a large pore size zeolite catalyst; (c) contacting a hydrocarbon feedstock with the second catalyst inventory in a reactor riser to form cracked products; wherein the first catalyst inventory comprises more than 50 wt % medium pore size catalyst based on the total mass of the catalyst inventory and wherein at least 50% of the medium pore size catalyst is fresh catalyst. With the process according to the invention an increased selectivity to C3 and C4 olefins can be achieved. In addition, a C5+ gasoline can be obtained having an improved RON.

DETAILED DESCRIPTION OF THE INVENTION

Figure 1:
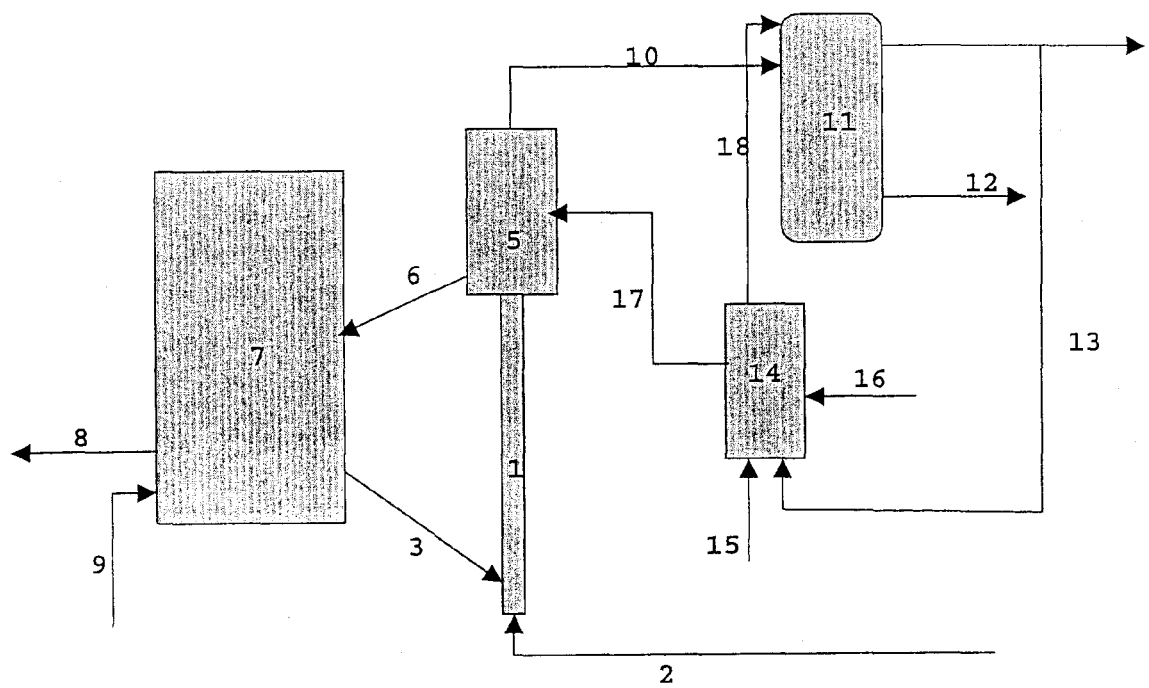
FIG. 1 shows a schematic representation of a FCC process according to a preferred embodiment of the invention.

We now found that cracking of a light hydrocarbon feedstock over a catalyst inventory comprising more than 50 wt % medium pore size catalyst based on the total mass of the catalyst inventory and whereof at least 50% of the medium pore size catalyst is fresh catalyst results in excellent selectivities to $C_3$ and $C_4$ olefins, mostly propylene.

In addition to the above it has been found that the process of the invention can be used to produce gasoline having improved octane numbers (both RON and MON). When gasoline is used as hydrocarbon feedstock, we found that the octane numbers of gasoline resulting from step (a) were increased by up to 3.3 points due to the fact that the gasoline became richer in aromatic compounds than the original light hydrocarbon feedstock.

In the process according to the present invention the $C_3$ and $C_4$ olefins that can be prepared include propylene and butylenes, i.e. 1-butylene, 2-butylene and isobutylene. The process according to the present invention is especially advantageous for the preparation of propylene.

With catalyst inventory, as used in the process according to the present invention, is meant the total amount of catalyst present at a certain stage of the process. With catalyst is meant the total of catalytic active phase, for example zeolite crystals, and inactive phase, for example matrix materials or supports. By fresh catalyst is understood a catalyst that has not been subjected to a regeneration step, wherein coke and hydrocarbonaceous materials as deposited on said catalyst are combusted. The catalyst can comprise up to 25 wt % carbon, preferably up to 10 wt % carbon, more preferably up to 5 wt % carbon. Most preferably the fresh catalyst contains no carbon. The catalyst may be subjected to a calcination treatment or a drying treatment before entering step (a).

The first catalyst inventory that is being used in step (a) comprises at least one medium pore zeolite catalyst. It is possible that up to 10 different medium pore zeolite catalysts are being used, more preferably up to 5 different medium pore zeolite catalysts are being used, even more preferable up to 3 or 2 different medium pore zeolite catalysts are being used. In the most preferred embodiment only one medium pore zeolite catalyst is being used in step (a).

The first catalyst inventory of step (a) comprises more than 50 wt %, preferably more than 70 wt %, more preferably more than 80 wt % and even more preferably more than 90 wt % of the medium pore zeolite catalyst based on the total mass of the catalyst inventory. Next to the catalyst comprising the medium pore size zeolite also other catalysts can be present, for example large pore zeolite catalysts, amorphous silica-alumina catalysts, and other refractory oxide supported metal catalysts. If present, it is preferably present up to an amount of 50 wt %, more preferably up to an amount of 30 wt %, more preferably up to an amount of 20 wt % and even more preferably up to an amount of 10 wt % based on the total mass of the catalyst inventory. In the most preferred embodiment, the first catalyst inventory comprises only one medium pore zeolite catalyst and no other catalyst is present.

At least part of the first catalyst inventory is combined in step (b) with one or more catalyst streams to form the second catalyst inventory. One of those catalyst streams can comprise an equilibrium catalyst. By equilibrium catalyst is meant the catalyst as present in the FCC unit that is being used for cracking and that has passed the riser reactor at least one time. It can furthermore be combined with a catalyst stream comprising fresh catalyst comprising large pore size zeolite catalyst and/or medium pore size zeolite catalyst, preferably only large pore size zeolite catalyst, that is continuously being added to the FCC unit to compensate for the loss of catalyst during the FCC process or to compensate for loss in activity.

Once the catalyst of the formed second catalyst inventory has passed the reactor riser of step (c) it is referred to as equilibrium catalyst.

The equilibrium catalyst has been partially deactivated by the deposition of coke, and of metals such as nickel, vanadium and iron from the feed. This deposited coke inhibits the catalytic activity by blocking active sites. After the catalytic cracking reactions in the reactor riser it is transferred to the stripper to remove absorbed hydrocarbons. It is then sent to the regenerator to remove the coke by oxidation in air; this serves to generate appreciable quantities of heat. Somewhere after leaving the riser reactor and entering this reactor again a second catalyst inventory can be formed by combining this equilibrium catalyst stream with the first catalyst inventory of step (a) and optionally other catalyst streams.

Since catalyst continually circulates between the riser reactor and the regenerator it therefore serves to transfer heat from the regenerator to the feed. The continual formation of the second catalyst inventory and withdrawal of spent catalyst leads to an equilibrium catalyst in the FCC Unit. Preferably, in the range from 0.1 to 4 kg of a combination of the first catalyst inventory and a large pore zeolite catalyst per ton of fresh feed needs to be refreshed and/or added per day in step (a). More preferably in the range from 0.2 to 2 kg of a combination of the catalysts per ton of fresh feed needs to be refreshed and/or added, depending on the properties of the hydrocarbon feedstock. With a heavy feedstock, like residues, a higher amount of catalyst is needed due to for example metal impurities in the feed. If a very clean feedstock is being used, like for example a Fischer-Tropsch feed, a lower amount of catalyst needs to be added to the catalyst inventory.

The second catalyst inventory comprises at least one large pore zeolite catalyst and at least one medium pore zeolite catalyst. It is possible that up to 10 different large pore zeolite catalysts are being used, more preferably up to 5 different large pore zeolite catalysts are being used, even more preferable up to 3 or 2 different large pore zeolite catalysts are being used. This can be used in combination with up to 10 different medium pore zeolite catalysts, more preferably with up to 5 different large pore zeolite catalysts, even more preferable with up to 3 or 2 different large pore zeolite catalysts. In the most preferred embodiment the second catalyst inventory comprises only one large pore zeolite catalyst and only one medium pore zeolite catalyst. The amount of large pore zeolite catalyst is preferably in the range from 70 to 99 wt % relative to the second catalyst inventory, more preferably in the range from 85 to 98 wt %. The amount of medium pore zeolite catalyst is preferably in the range from 1 to 30 wt % relative to the second catalyst inventory, more preferably in the range from 2 to 15 wt %.

By the medium pore zeolite as used in all the steps (a), (b) and (c) of the present invention is understood a zeolite comprising a porous, crystalline aluminosilicate structure having a porous internal cell structure on which the major axis of the pores are in the range from 0.45 to 0.62 nanometer. Axis of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such medium pore zeolites are of the MFI structural type such as ZSM-5, the MTW type, such as ZSM-12, the TON structural type such as theta one, and the FER structural type such is ferrierite. According to the present invention preferably ZSM-5 is used as the medium pore zeolite.

With the large pore zeolite, as for example used in step (b) and (c), a zeolite is meant comprising a porous, crystalline aluminosilicate structure having a porous internal cell structure on which the major axis of the pores are in the range from 0.62 to 0.8 nanometer. Examples of such large pore zeolites are FAU or faujasite, preferably synthetic faujasite, like zeolite Y, USY, Rare Earth Y (=REY) or Rare Earth USY (RE-USY). According to the present invention preferably USY is used as the large pore zeolite.

In a preferred embodiment the invention provides a process for the preparation of $C_3$ and/or $C_4$ olefins and gasoline by: (a) contacting in a reactor a light hydrocarbon feedstock with a first catalyst inventory comprising a ZSM-5 catalyst and thereby forming a cracked product stream comprising C3 and/or C4 olefins; (b) combining at least part of the first catalyst inventory as used in step (a) with one or more catalyst streams to form a second catalyst inventory comprising at least a ZSM-5 catalyst and a USY catalyst; (c) contacting a hydrocarbon feedstock with the second catalyst inventory in a reactor riser to form cracked products; wherein the first catalyst inventory comprises more than 50 wt % ZSM-5 catalyst based on the total mass of the catalyst inventory and wherein at least 50% of the ZSM-5 catalyst is fresh catalyst.

The total amount of medium pore size zeolite or large pore zeolite that is present in the catalysts is preferably in the range from 5 to 40 wt %, more preferably in the range from 10 to 30 wt %, even more preferably in the range from 10 to 25 wt % relative to the total mass of the catalyst.

Next to the large or medium pore size zeolite, the catalysts may comprise one or more porous, inorganic refractory metal oxide binder materials or supports and/or active matrix materials. These binder materials or supports may or may not contribute to the cracking reaction in one or both the steps. Examples of such binder materials are silica, alumina, titania, zirconia and magnesium oxide, or combinations of two or more of them. Also organic binders may be used.

The medium pore size zeolite catalyst used in step (a) comprises at least 50% fresh catalyst, preferably at least 70% fresh catalyst, more preferably at 80% least fresh catalyst, even more preferably at least 90% fresh catalyst, and even more preferably 95% fresh catalyst. In the most preferred embodiment all medium pore size zeolite catalyst is fresh catalyst. By fresh catalyst is understood a catalyst that has not been subjected to a regeneration step, wherein coke and hydrocarbonaceous materials as deposited on said catalyst are combusted. The catalyst can comprise up to 25 wt % carbon, preferably up to 10 wt % carbon, more preferably up to 5 wt % carbon. Most preferably the fresh catalyst contains no carbon. The catalyst may be subjected to a calcination treatment or a drying treatment before entering step (a). The catalyst may be subjected to a calcination treatment or a drying treatment before entering step (a). Of the first catalyst inventory, preferably in the range from 5 to 30 wt %, more preferably in the range from 10 to 25 wt % relative to the total mass of the first catalyst inventory is withdrawn per day and combined in step (b). The amount is such that the ratio of the medium pore size zeolite and the large pore zeolite in the equilibrium catalyst is maintained at the preset value.

Step (a) is preferably performed in a fluidized bed system, more preferably in a dense fluidized bed system. Step (a) can also be performed in a riser reactor. A fluidized bed system has a catalyst density of between 100 and 800 kg/m$^3$. With dense fluidized bed system is especially meant a fluidized bed system having a catalyst density of between 300 and 800 kg/m$^3$. The density of the fluidized bed zone is always higher than the density of catalyst in the riser reactor zone of step (c). In the riser reactor the catalyst density varies, but above the feed nozzles the catalyst density of 25 to 100 kg/m$^3$ can be present. One of the advantages of using a fluidized bed system in step (a) is that the contact time of the feed and the catalyst is longer then in a reactor riser as used in step (c), resulting in a better cracking process. A further advantage is that a dense fluidized bed is relatively simple to operate as compared to a reactor riser. An even further advantage is that a fluidized bed reactor can more easily and more cost effective be used for revamping of existing units.

The feed used in step (a) is a light hydrocarbon feedstock. With a light hydrocarbon feedstock is meant a hydrocarbon fraction or a gasoline with a boiling point in the range from $C_3$ to 230° C. More preferably, the light hydrocarbon feedstock has a boiling point in the range from $C_5$ to 200° C. This fraction can be obtained from an FCC-process, but also from a thermocracking process, like visbreaking, thermal cracking, coking, delayed coking or flexicoking. It can also be obtained from a steam cracking process, or directly by distillation of a mineral crude source, the so-called straight run gasoline. Another possibility is that the fraction is obtained from a Fischer-Tropsch process as described in for example US-A-20030203982, WO-A-9934917, or U.S. Pat. No. 6,776,898. Preferably, the light hydrocarbon feedstock is full range cat cracked gasoline, light cat cracked gasoline, heart cut cat cracked gasoline or heavy cat cracked gasoline, all as obtained from FCC process or coker gasoline as obtained from a thermo cracking process or combinations thereof.

Feeds that can be used in step (c) include hydrocarbon feedstocks that are high boiling, non-residual oils, such as vacuum gas oil, straight run (atmospheric) gas oil, coker gas oils and residues (either atmospheric or vacuum). These feedstocks have boiling points preferably ranging from 220° C. to 650° C., more preferably ranging from 300° C. to 600° C.

As feed to step (c), also a Fischer-Tropsch synthesis product can be used. The Fischer-Tropsch synthesis product which can be used as feed in step (c) can be obtained by well-known processes, for example the so-called commercial Sasol process, the Shell Middle Distillate Process or by the non-commercial Exxon process. These and other processes are for example described in more detail in EP-A-776959, EP-A-668342, U.S. Pat. Nos. 4,943,672, 5,059,299, WO-A-9934917 and WO-A-9920720. Typically these Fischer-Tropsch synthesis products will comprise hydrocarbons having 1 to 100 and even more than 100 carbon atoms. The Fischer-Tropsch product will comprise iso-paraffins, n-paraffins, oxygenated products and unsaturated products. The Fischer-Tropsch product may optionally be subjected to a hydroisomerisation step in order to obtain a product which is more readily transportable, e.g. lowering the pour point, in case the Fischer-Tropsch process is located in a far away country relative to the process according to the present invention. Alternatively the process according to the present invention may be located near the Fischer-Tropsch process side. The process of the present invention is especially advantageous when a Fischer-Tropsch synthesis product is used as feed for step (c), wherein a substantial part, preferably more than 10 wt %, more preferably more than 30 wt % and even more preferably more than 50 wt % of the Fischer-Tropsch synthesis product boils above 550° C. An example of a suitable process which may prepare such a heavy Fischer-Tropsch synthesis product is described in WO-A-9934917 and in AU-A-698392. If a Fischer-Tropsch feed is being used in step (c) the feedstock has a boiling point preferably starting from 220° C., more preferably from 300° C. and includes the whole residual fraction.

Preferably, the light hydrocarbon feedstock for step (a) comprises a selection of the cracked products obtained in step (c). The cracked products of step (c) comprises for example LPG, naphtha, gasoline, kerosene, and heavier fractions. This selected light hydrocarbon fraction can be isolated from the cracked products by any technique known by the person skilled in the art, for example distillation. Such a light hydrocarbon feedstock as obtained from an FCC process is difficult to crack again by definition since it has already passed once through the riser. For example, in FCC units in which ZSM-5 is routinely added to the USY-catalyst, the FCC light hydrocarbon feedstock has already experienced the effect of ZSM-5 present in the catalyst inventory. So the increased activity of fresh catalysts is utilized. In a preferred embodiment, also the longer contact time between catalyst and feed in the fluidized bed in step (a) is being used.

Thus, in a preferred embodiment according to the invention a fully integrated FCC process is performed wherein at least part of the first catalyst inventory of step (a) is combined with one or more catalyst streams to form the second catalyst inventory of step (c) and the light hydrocarbon feedstock comprises a selection of the cracked products obtained in step (c). Hence the present invention further provides in a process for the preparation of $C_3$ and $C_4$ olefins and gasoline by:
(a) contacting in a reactor a light hydrocarbon feedstock with a first catalyst inventory comprising a medium pore size zeolite catalyst and thereby forming a product stream comprising C3 and/or C4 olefins; (b) combining at least part of the catalyst inventory as used in step (a) with one or more catalyst streams to form a second catalyst inventory comprising at least a medium pore size zeolite catalyst and a large pore size zeolite catalyst; (c) contacting a hydrocarbon feedstock with the second catalyst inventory in a reactor riser to form cracked products; wherein the first catalyst inventory comprises more than 50 wt % medium pore size catalyst based on the total mass of the catalyst inventory and wherein at least 50% of the medium pore size catalyst is fresh catalyst and wherein the light hydrocarbon feedstock comprises a selection of the cracked products of step (c). Preferences are as described above.

The reaction conditions in step (a) when the light hydrocarbon feedstock and the first catalyst inventory are contacted with each other, preferably include a temperature in the range from 400 to 700° C., and a pressure in the range from 0.3 to 10 bar absolute. In the preferred case, when the light hydrocarbon feedstock and the first catalyst inventory are contacted with each other in a fluidized bed, the reaction conditions in step (a) preferably include a temperature in the range from 400 to 700° C., a pressure in the range from 0.3 to 10 bar absolute and a weight hourly space velocity (WHSV) in the range from 5 to 50 $hr^{-1}$, preferably in the range from 5 to 30 $hr^{-1}$, more preferably in the range from 7 to 15 $hr^{-1}$.

The reaction conditions in step (c), when the hydrocarbon feedstock and the second catalyst inventory are contacted with each other in the reactor riser to form the cracked products preferably include a temperature in the range from 400 to 700° C., a pressure in the range from 1 to 10 bar absolute, and a vapour residence time in the range from 0.1 to 10 seconds. The catalyst inventory to hydrocarbon feedstock weight ratio in step (a) preferably lies in the range from 1:1 to 20:1, preferably in the range from 3:1 to 10:1.

Step (a) may require an additional source of heat in order to provide the latent heat of vaporization of the feedstock and the reaction heat of the cracking reactions. There are various possible ways of providing this additional heat. One possible way is to have an additional vessel alongside the fluidized bed of step (a) and to create the extra heat by exposing the catalyst in the additional vessel to the off-gases of a pre-heated flow of air. The catalyst, being heated in the additional vessel, is then circulated back and forth between the fluidized bed and the additional vessel. Another possible way is to lead the hot off gas of the regenerator through one or more heat exchangers that are in contact with the catalyst or the light hydrocarbon feedstock.

The process according to the invention as described hereinabove can advantageously be carried out in a FCC unit equipped with an additional fluidized bed reactor. Such a FCC unit is considered to be novel in itself. Accordingly the present invention also provides an industrial set-up for fluid catalytic cracking comprising a riser reactor, a separator vessel, a stripper, a regenerator, and an additional fluidized bed reactor for the production of $C_3$ and $C_4$ olefins.

With the process of the invention a method is provided with which propylene yield in a FCC unit can be improved. Accordingly, the present invention also provides a method for improving the propylene productivity of a fluid catalytic cracking unit, which unit produces cracked products comprising a light hydrocarbon feedstock boiling in the range of from $C_3$ to 230° C., from a hydrocarbon feedstock, said unit comprising a riser reactor for catalytically cracking the hydrocarbon feedstock, a separator vessel, a stripper, a regenerator, a distiller and a catalyst inventory comprising a large pore size zeolite catalyst said method comprising: (a) adding at least one separate reactor to said unit; (b) adding a catalyst inventory comprising more than 50 wt % of a medium pore size zeolite catalyst, based on the total mass of the catalyst inventory, to the separate reactor; (c) feeding a light hydrocarbon feedstock into said separate reactor; (d) feeding part of the catalyst inventory comprising the medium pore size zeolite catalyst as used in the separate reactor to the reactor riser, stripper or regenerator of the unit, wherein at least 50% of the medium pore size catalyst is fresh catalyst and wherein the light hydrocarbon feedstock comprises a selection of the cracked products obtained from the reactor riser.

The added separate reactor is preferably a fluidized bed reactor. One of the advantages of using a fluidized bed reactor is that the contact time of the feed and the catalyst is longer then in for example a reactor riser resulting in a better cracking process. A further advantage is that a fluidized bed reactor is relatively simple to operate as compared to a reactor riser.

The large pore size zeolite catalyst is preferably a faujasite type zeolite, more preferably zeolite Y, USY, Rare Earth Y (=REY) or Rare Earth USY (REUSY), even more preferably USY. The medium pore size zeolite catalyst is preferably ZSM-5 or ZSM-12, or mixtures thereof, more preferably ZSM-5.

The reaction conditions for cracking in the additional reactor preferably include a temperature in the range from 400 to 700° C., and a pressure in the range from 0.3 to 10 bar absolute.

FIG. 1 shows a schematic representation of a preferred embodiment of the process according to the present invention. To a riser reactor (1) a hydrocarbonaceous feed is fed via conduit (2) and hot regenerated catalyst via conduit (3). After separation of cracked products the catalyst is stripped with steam in the stripper (5) to remove the non-volatile hydrocarbon products from the catalyst. The inlet for steam and outlet for non-volatile hydrocarbon products of the stripper are not shown. Stripped catalyst is being fed to the regenerator (7) via conduit (6). The inlet for oxygen containing gas and outlet for off gases of the regenerator are not shown. At least part of the spent catalyst is removed from the regenerator via conduit (8) and fresh catalyst comprising the large pore size zeolite is added to the regenerator via conduit (9). Regenerated hot catalyst is recycled to the riser via conduit (3). Cracked products exit the stripper via conduit (10) and are distilled in the distillation section (11) into several fractions including a light hydrocarbon fraction. A heavy products stream leaves the distillation section via conduit (12). At least part of the light hydrocarbon fraction is recycled via conduit (13) to a lower olefin production unit (14). Light hydrocarbon fractions originating from other sources can be added to the lower olefin production unit (14) via conduit (15). Fresh catalyst comprising the medium pore size zeolite is added to the lower olefin production unit (14) via conduit (16). Used catalyst comprising the medium pore size zeolite is withdrawn from the lower olefin production unit (14) via conduit (17) and added via the stripper (5). The products from the lower olefin production unit (14) enter the distillation section (11) via conduit (18).

EXAMPLES

The invention will be illustrated by the following non-limiting examples.

Example 1

Cracking reactions on laboratory scale were performed using a fluidized bed reactor in combination with on-line GC product analysis with in-situ catalyst regeneration.

An amount of ZSM-5 catalyst that contained 25 wt % ZSM-5 crystals was calcined at 650° C. for 16 hours before use. 10 gram of the calcined fresh ZSM-5 catalyst was fluidized with nitrogen at 540° C. An amount of full range cat cracked gasoline (IBP=2° C., FBP=229° C.), resulting in a catalyst/oil weight ratio of 6, was injected for 60 seconds and flushed through a tube with nitrogen (flow 90 ml/min) to the fluidized catalyst bed. The WHSV was 10 $hr^{-1}$ and the pressure was 1.1 bar absolute. The properties of the feed are in table 2 under full range CCG 1. The feed was cracked at 540° C. and the liquid product collected in glass vessels (receivers) that were cooled to −15° C. The product gas was analyzed online with a gas chromatograph after the stripping step. Coke formation was quantified by measuring the amount of $CO_2$ that was generated by exposing the catalyst to air for 40 minutes at 650° C. The formed $CO_2$ was measured by on-line infrared measurement. The liquid products were separately analyzed by total boiling point (tbp580) measurements and GC-PIONA measurements, according to ASTM D5443-93.

The results of the online gas chromatograph analysis and the analysis of the liquid products were combined giving the amounts of propylene and butylene. From these amounts the selectivity to propylene and butylene were calculated, on basis of the total products formed. These results are presented in Table 1.

Comparative Example A

The same experiment was performed as in Example 1, only now a fresh USY catalyst was tested. The results are also presented in Table 1. As can be seen from the results, fresh USY-catalyst, being a large pore zeolite catalyst, has a negative effect on product selectivities: too much dry gas and coke are formed at the expense of LPG, gasoline and cycle oils.

Comparative Example B

The same experiment was performed as in Example 1, only now an equilibrium catalyst that has been used in the FCC process and has been withdrawn from the FCC unit, containing 7 wt % ZSM-5 catalyst and 93 wt % USY catalyst, based on the total mass of catalyst, was tested. The results are presented in Table 1.

Comparative Example C

The same experiment was performed as in Example 1, only now a fresh USY catalyst blended with a 7 wt % fresh ZSM-5 catalyst, based on total mass, was tested. The results are also presented in Table 1.

TABLE 1

| Ex. | Conv. to $C_4$ minus[1] (wt %) | Propylene yield (wt %) | Propylene + butylenes selectivity (%) | $C_3$ olefinicity[2] (%) | Dry gas[3] (wt %) | Coke (wt %) |
|---|---|---|---|---|---|---|
| 1 | 18 | 8.2 | 76 | 91 | 2.4 | 0.2 |
| Comp A | 38 | 3.7 | 15 | 40 | 4.3 | 12 |
| Comp B | 12.8 | 3.5 | 53 | 82 | 1.5 | 1.0 |
| Comp C | 41.4 | 4.0 | 14.6 | 37 | 4.6 | 12.5 |

[1] With $C_4$ minus is meant $H_2S$, $H_2$, $CH_4$, $C_2H_6$, $C_2H_4$, $C_3H_8$, $C_3H_6$, $C_4H_{10}$, $C_4H_8$.
[2] With olefinicity is meant the amount of propylene divided by the total amount of propylene and propane
[3] With dry gas is meant $C_2$ minus or $H_2S$, $H_2$, $CH_4$, $C_2H_6$, $C_2H_4$ The conversion to $C_4$-minus products is up to 41.4%. The remaining liquid unconverted $C_5+$ fraction comprises gasoline. Propylene and butylenes selectivities are relative to the converted $C_4$-minus products. It is clear from the results in table 1 that the fresh ZSM-5 catalyst is more selective than USY based catalysts in producing $C_3$ and $C_4$ olefins, especially propylene, and more active than an e-catalyst containing deactivated ZSM-5. Furthermore, dry gas make and coke formation is significantly lower than in the other cases. This demonstrates that it is advantageous to use a separate step with a different catalyst than used in a FCC reactor, to increase the yield to lower olefins.

Example 2

The experiment was performed according to example 1 only now different feeds were used (see table 2 for the properties of the feeds as obtained with PIONA measurements). All the feeds fall in the boiling range of the light hydrocarbon feedstock boiling range, namely from $C_3$ to 230° C. The results are summarized in Table 3. The remaining $C_5+$ fraction comprises gasoline. In the table CCG is used as abbreviation for Cat Cracked Gasoline. The Full Range Cat Cracked Gasoline 1 and 2 were produced in commercial FCC Units using a catalyst inventory that contained respectively 2 wt % and 7 wt % of a ZSM-5 catalyst besides a USY catalyst. Therefore, the efficacy of the process with fresh ZSM-5 is demonstrated as the Full Range Cat Cracked gasolines have already experienced ZSM-5 in the riser.

TABLE 2

| Gasoline | Naphthenes (wt %) | i-paraffins (wt %) | n-paraffins (wt %) | Cyclic olefins (wt %) | iso-olefins (wt %) | n-olefins (wt %) | Aromatics (wt %) |
|---|---|---|---|---|---|---|---|
| Full Range CCG 1 | 10.1 | 28.1 | 4.1 | 3.0 | 10.2 | 7.0 | 30.1 |
| Full Range CCG 2 | 13.4 | 28.8 | 2.8 | 2.4 | 15.2 | 3.9 | 23.2 |
| Full Range CCG 3 | 12.4 | 31.0 | 5.9 | 4.3 | 9.2 | 2.6 | 23.5 |
| Heart Cut CCG | 22.5 | 22.9 | 2.3 | 2.1 | 6.3 | 1.7 | 40.6 |
| Heavy CCG | 7.4 | 8.6 | 1.3 | 0.1 | 0.6 | 0.2 | 33.6 |
| Coker Gasoline | 11.1 | 15.7 | 26.1 | 6.4 | 13.5 | 13.2 | 9.7 |
| Ethylene Cracker Gasoline | 3.8 | 5.6 | 6.2 | 2.5 | 4.8 | 1.3 | 72.1 |
| Light CCG | 9.1 | 49.4 | 6.0 | 5.3 | 15.8 | 10.1 | 4.1 |
| Hydrotreated naphtha | 33.4 | 31.4 | 20.5 | 0.04 | 0.06 | 0.1 | 12.4 |

TABLE 3

| Gasoline | Conv. to $C_4^-$ (wt %) | Propylene yield (wt %) | Propylene + butylenes selectivity | $C_3$ olefinicity (%) | Dry gas wt % | Coke wt % |
|---|---|---|---|---|---|---|
| Full Range CCG 1 | 18 | 8.5 | 75 | 91 | 2.5 | 0.20 |
| Full Range CCG 2 | 18 | 8.5 | 78 | 92 | 2.5 | 0.25 |
| Heart Cut CCG | 12 | 5.2 | 78 | 93 | 1.5 | 0.25 |
| Heavy CCG | 7 | 3 | 74 | 93 | 1.0 | 0.25 |

TABLE 3-continued

| Gasoline | Conv. to $C_4^-$ (wt %) | Propylene yield (wt %) | Propylene + butylenes selectivity | $C_3$ olefinicity (%) | Dry gas wt % | Coke wt % |
|---|---|---|---|---|---|---|
| Coker Gasoline | 25 | 11 | 76 | 88 | 3.2 | 0.25 |
| Ethylene Cracker Gasoline | 5 | 1.8 | 45 | 95 | 2.1 | 0.45 |
| Light CCG | 37 | 12 | 55 | 65 | 6.5 | 0.3 |
| Light CCG[#] | 22.2 | 6.4 | 73 | 75 | 1.7 | 0.12 |
| Hydrotreated naphtha | 5.5 | 2 | 57 | 80 | 1.2 | 0.13 |

[#]measured at a reactor temperature of 450° C.

Example 3

Increase of RON and MON for a number of $C_5+$ products as obtained in example 2 were calculated from the results obtained with the GC-PIONA method, according to ASTM D5443-93. The results are presented in Table 4. As can be seen from the table the liquid fraction ($C_5+$) obtained have a significantly higher octane number. This is mainly because the aromatic content of the liquid fraction of the product increases significantly due to treatment in the cracking step with fresh ZSM-5.

TABLE 4

| | Feeds | | Gasoline product | |
|---|---|---|---|---|
| | GC-RON | GC-MON | GC-RON | GC-MON |
| Full Range CCG 1 | 90.8 | 80.5 | 92.7 | 81.4 |
| Full Range CCG 2 | 88.8 | 79.6 | 90.0 | 79.3 |
| Heart Cut CCG | 86.2 | 78.7 | 89.5 | 79.6 |
| Heavy CCG | 83.8 | 76.8 | 86.5 | 78.4 |
| Coker Gasoline | 65.5 | 63.5 | 67.2 | 63.5 |
| Hydrotreated naphtha | 61.7 | 63.5 | 62.7 | 64.2 |

Example 4

Figure 2:
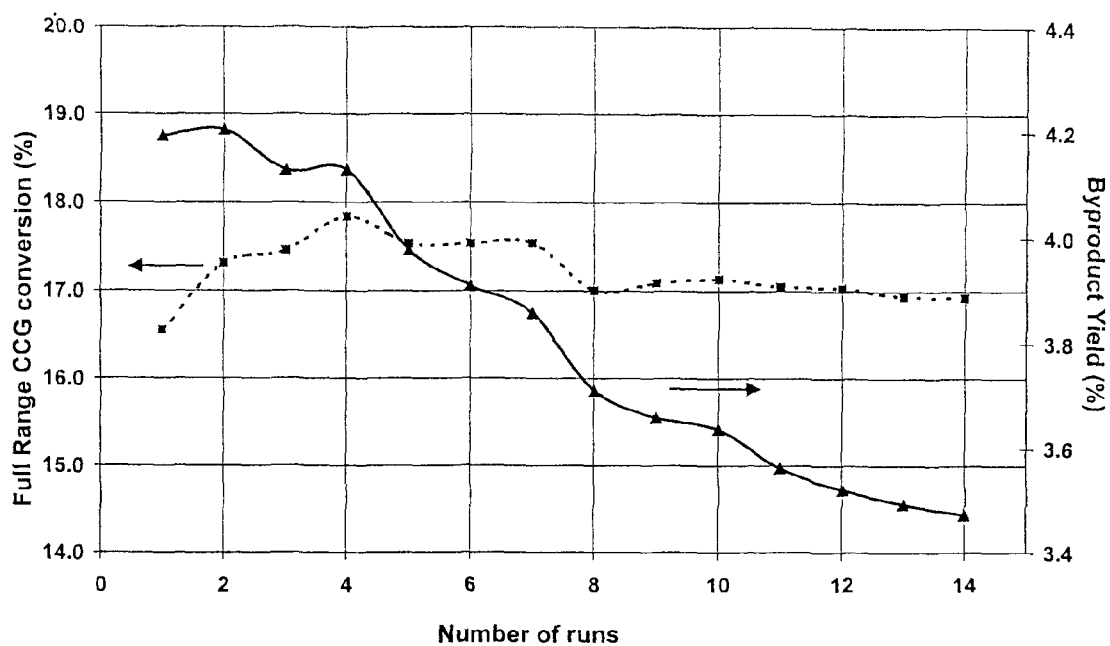
FIG. 2 shows Full Range Cat Cracked Gasoline Conversion and byproduct yield at a catalyst to oil ratio of 6 without regeneration between runs.
Figure 3:
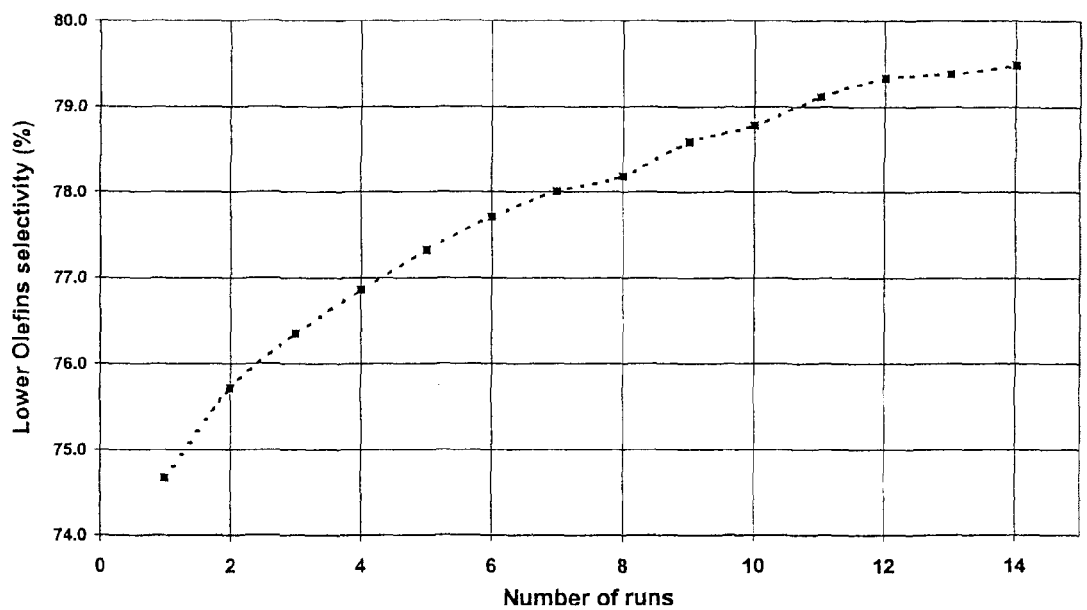
FIG. 3 shows the C3 and C4 olefins selectivity at a catalyst to oil ratio of 6 without regeneration between runs.

The activity of ZSM-5 in the cracking reaction was furthermore tested for more runs without regeneration in between runs. The testing conditions were furthermore identical to Example 1. The results are presented in the FIGS. 2 and 3. It can be seen from the figures that the conversion is maintained, the propylene yield remains constant, the propylene and butylene selectivity increases from 75 to 79.5% and byproduct (drygas plus coke) decreases from 4.2 wt % to 3.5 wt %. So the selectivities to the desired products improve on ageing of the fresh ZSM-5 without significant conversion losses.

Example 5

Experiments were performed according to example 1 only now different reaction temperatures were used. The results are summarized in Table 5. The properties of the full range cat cracked gasoline are in table 2 under Full Range CCG 2. From the results in the table can be concluded that the conversion to propylene and propylene yield increases with T. However, the best propylene/dry gas ratio is obtained at lower T (i.e. 480° C.).

Example 6

Experiments were performed according to example 1 only now the ZSM-5 catalyst of example 1 was compared with a catalyst that has been treated with steam of 788° C. for 2.2 hours and for 98 hours and Full Range CCG 3 has been used as feed. The results are presented in table 6. The results in the table show that the conversion decreases with increasing steaming time, and the selectivity to C3 and C4 olefins improves as well as a decreasing dry gas make.

TABLE 5

| Temperature | Conv. to $C_4^-$ (wt %) | Propylene yield (wt %) | Propylene + butylenes selectivity | $C_3$ olefinicity (%) | Dry gas wt % | Coke wt % |
|---|---|---|---|---|---|---|
| 480 | 19.5 | 6.3 | 62.5 | 72.3 | 2.4 | 0.2 |
| 500 | 22.7 | 7.3 | 58.4 | 68.6 | 3.3 | 0.2 |
| 520 | 23.1 | 8.3 | 63.1 | 76.0 | 3.8 | 0.2 |
| 540 | 24.7 | 9.1 | 62.5 | 77.5 | 4.5 | 0.2 |
| 560 | 25.0 | 10.0 | 65.0 | 82.8 | 5.0 | 0.2 |

TABLE 6

| Gasoline | Conv. to $C_4^-$ (wt %) | Propylene yield (wt %) | Propylene + butylenes selectivity | $C_3$ olefinicity (%) | Dry gas wt % | Coke wt % |
|---|---|---|---|---|---|---|
| Fresh ZSM-5 | 24 | 8.5 | 61 | 75 | 4.1 | 0.55 |
| ZSM-5 steamed (2.2 hrs) | 18 | 8.0 | 74 | 88.7 | 2.5 | 0.33 |
| ZSM-5 steamed (98 hrs) | 11 | 5.1 | 85 | 97 | 1.0 | 0.25 |

What is claimed is:

1. A process for the preparation of $C_3$ and/or $C_4$ olefins by:
(a) contacting in a dense fluidised bed system a light hydrocarbon feedstock with a first catalyst inventory comprising up to an amount of 30 wt % large pore zeolite catalyst and more than 70 wt % based on the total mass of the catalyst inventory of a medium pore size zeolite catalyst, at least 50% of which is fresh medium pore size zeolite catalyst, wherein said dense fluidised bed system has a catalyst density of between 300 and 800 kg/m³, and wherein said dense fluidised bed system is operated under first reaction conditions including a first temperature in the range of from 400 to 700° C., a first pressure in the range of from 0.3 to 10 bar absolute, a first weight hourly space velocity (WHSV) in the range of from 5 to 50 hr⁻¹, and wherein the weight ratio of said first catalyst inventory to said light hydrocarbon feedstock is in the range of from 1:1 to 20:1, to thereby form a cracked product stream comprising at least one of $C_3$ and $C_4$ olefins;
(b) combining at least part of the first catalyst inventory as used in step (a) with an equilibrium catalyst, a fresh catalyst and a regenerated catalyst to form a second catalyst inventory comprising medium pore size zeolite catalyst and large pore size zeolite catalyst; and (c) contacting a hydrocarbon feedstock with the second catalyst inventory in a riser reactor to form a second cracked product stream, wherein the catalyst density of said dense fluidised bed system is higher than the catalyst density in said riser reactor, and wherein said riser reactor is operated under second reaction conditions including a second temperature in the range of from 400 to 700° C., a second pressure in the range of from 1 to 10 bar absolute, and a vapor residence time in the range of from 0.1 to 10 seconds.

2. The process according to claim 1, wherein the density of the catalyst in the riser reactor above the feed nozzles in step (c) is from 25 to 100 kg/m³.

3. The process according to claim 2, wherein the light hydrocarbon feedstock comprises a selection of the cracked products of step (c).

4. The process according to claim 1, wherein the light hydrocarbon feedstock comprises a Fischer-Tropsch synthesis product.

5. The process according to claim 1, wherein the medium pore zeolite is ZSM-5 or ZSM-12, or mixtures thereof.

6. The process according to claim 1, wherein the large pore zeolite is a faujasite type zeolite.

7. A method for improving the propylene productivity of a fluid catalytic cracking unit, which unit produces cracked products from a hydrocarbon feedstock, said unit comprising a riser reactor for catalytically cracking the hydrocarbon feedstock, a separator vessel, a stripper, a regenerator, a distiller and a catalyst inventory comprising a large pore size zeolite catalyst said method comprising:

(a) adding a dense fluidised bed system to said unit, said dense fluidised bed system having a catalyst density higher than the catalyst density of the catalyst in said riser reactor;

(b) adding a first catalyst inventory comprising up to an amount of 30 wt % large pore zeolite catalyst and more than 70 wt % of a medium pore size zeolite catalyst, based on the total mass of the catalyst inventory, to the dense fluidised bed system;

(c) combining at least part of the first catalyst inventory as used in step (a) with an equilibrium catalyst, a fresh catalyst and a regenerated catalyst to form a second catalyst inventory comprising medium pore size zeolite catalyst and large pore size zeolite catalyst; and (d) contacting a hydrocarbon feedstock with the second catalyst inventory in a riser reactor to form a second cracked product stream, wherein the catalyst density of said dense fluidised bed system is higher than the catalyst density in said riser reactor, and wherein said riser reactor is operated under second reaction conditions including a second temperature in the range of from 400 to 700° C., a second pressure in the range of from 1 to 10 bar absolute, and a vapor residence time in the range of from 0.1 to 10 seconds.

8. The method according to claim 7, wherein the large pore size zeolite catalyst is a faujasite type zeolite.

9. The method according to claim 7, wherein the medium pore size zeolite catalyst is ZSM-5 or ZSM-12, or mixtures thereof.

10. The process according to claim 1, wherein the first catalyst inventory used in step (a) comprises more than 80% wt medium pore size zeolite catalyst based on the total mass of the catalyst inventory.

11. The process according to claim 3, wherein the light hydrocarbon feedstock has a boiling point in the range $C_3$ to 230° C.

12. The process according to claim 11, wherein the boiling point of the hydrocarbon feedstock in step (c) ranges from 220° C. to 650° C.

13. The process according to claim 12, wherein the medium pore zeolite is ZSM-5 or ZSM-12, or mixtures thereof, and comprises more than 90 wt % of the first catalyst inventory.

14. The process according to claim 13, wherein the boiling point of the light hydrocarbon feedstock in step (a) ranges from $C_5$ to 200° C.

15. The process according to claim 2, wherein the hydrocarbon feedstock employed in step (c) is a Fischer-Tropsch synthesis product boiling above 300° C.

16. The process according to claim 3, wherein the riser reactor employed in step (c) is the sole riser reactor employed in said process.

17. The process according to claim 4, wherein the large pore zeolite is a faujasite type zeolite selected from the group consisting of zeolite Y, USY, Rare Earth Y (REY) or Rare Earth USY (REUSY).

18. The process according to claim 1, further comprising:
distilling within a distillation section said cracked product stream and said second cracked product stream into a light hydrocarbon fraction and recycling at least part of said light hydrocarbon fraction to said dense fluidised bed system.

19. The process according to claim 18, wherein said light hydrocarbon feedstock comprises a hydrocarbon fraction boiling in the range of from $C_3$ to 230° C.

20. The process according to claim 19, wherein said hydrocarbon feedstock comprises a high boiling, non-residual oil boiling in the range of from 220° C. to 650° C.

21. The process according to claim 1, wherein the riser reactor employed in step (c) is the sole riser reactor employed in the process.

22. The process according to claim 7, wherein the first catalyst inventory employed in the dense fluidised bed system in step (a) has a catalyst density of between 300 and 800 kg/m³.

23. The process according to claim 22, wherein the second catalyst inventory employed in the riser reactor in step (c) has a catalyst density above the feed nozzles of between 25 and 100 kg/m³.

24. The process according to claim 10, wherein the first catalyst inventory used in step (a) comprises more than 90% wt medium pore size zeolite catalyst based on the total mass of the catalyst inventory, at least 90% of which medium pore size zeolite catalyst is fresh catalyst.

25. The process according to claim 24, wherein all the first catalyst inventory used in step (a) comprises medium pore size zeolite catalyst, and all of said medium pore size zeolite catalyst is fresh catalyst.

* * * * *